(12) United States Patent
Ludsteck et al.

(10) Patent No.: US 9,840,139 B2
(45) Date of Patent: Dec. 12, 2017

(54) STRUCTURAL UNIT FOR A HYBRID POWERTRAIN

(71) Applicant: ZF FRIEDRICHSHAFEN AG, Friedrichshafen (DE)

(72) Inventors: Sven Ludsteck, Muennerstadt (DE); Reinhard Deppert, Gochsheim (DE); Jürgen Buhlheller, Viereth (DE); Florian Schöneich, Kolitzheim (DE); Mathias Kopp, Bamberg (DE); Andreas Ratte, Dittelbrunn (DE); Alexander Bartha, Wuerzburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 112 days.

(21) Appl. No.: 14/765,404

(22) PCT Filed: Jan. 9, 2014

(86) PCT No.: PCT/EP2014/050290
§ 371 (c)(1),
(2) Date: Aug. 3, 2015

(87) PCT Pub. No.: WO2014/117980
PCT Pub. Date: Aug. 7, 2014

(65) Prior Publication Data
US 2015/0369299 A1 Dec. 24, 2015

(30) Foreign Application Priority Data
Feb. 1, 2013 (DE) .................. 10 2013 201 667

(51) Int. Cl.
*B60K 6/387* (2007.10)
*B60K 6/40* (2007.10)
(Continued)

(52) U.S. Cl.
CPC ............. *B60K 6/26* (2013.01); *B60K 6/387* (2013.01); *B60K 6/40* (2013.01);
(Continued)

(58) Field of Classification Search
CPC . B60K 6/26; B60K 6/387; B60K 6/40; B60K 6/48; B60K 2006/4825;
(Continued)

(56) References Cited

U.S. PATENT DOCUMENTS 6,294,854 B1 9/2001 Grosspietsch et al.
6,302,253 B1 * 10/2001 Link et al. ............. F02N 11/04
192/55.61
(Continued)

FOREIGN PATENT DOCUMENTS

DE 198 37 115 A1 5/2000
DE 199 13 915 A1 9/2000
(Continued)

OTHER PUBLICATIONS

Machine translation of DE 102010054545, downloaded from EPO. org on May 12, 2017.*

*Primary Examiner* — Richard Lorence
(74) *Attorney, Agent, or Firm* — Cozen O'Connor

(57) ABSTRACT

A constructional unit for a hybrid powertrain of a motor vehicle includes: an electric machine with a stator and a rotor, wherein the rotor is configured to transmit a torque to the powertrain; a clutch arrangement with at least one clutch actuation unit, wherein the clutch arrangement is configured to decouple an internal combustion engine from the powertrain, the internal combustion engine being provided parallel to the electric machine for transmitting a torque; and a vibration absorber apparatus configured to reduce vibrations in the powertrain. The clutch actuation unit is arranged axially substantially radially within the vibration absorber apparatus.

12 Claims, 2 Drawing Sheets

(51) Int. Cl.
  *B60K 6/48* (2007.10)
  *F16F 15/14* (2006.01)
  *B60K 6/26* (2007.10)

(52) U.S. Cl.
  CPC ... *B60K 2006/4825* (2013.01); *B60Y 2400/48* (2013.01); *F16D 2300/22* (2013.01); *F16F 15/14* (2013.01); *Y02T 10/6252* (2013.01); *Y10S 903/902* (2013.01); *Y10S 903/914* (2013.01); *Y10S 903/951* (2013.01)

(58) Field of Classification Search
  CPC ............ Y10S 903/902; Y10S 903/914; Y10S 903/951; Y02T 10/6221; F16F 15/14
  See application file for complete search history.

(56) References Cited

U.S. PATENT DOCUMENTS

| | | | |
|---|---|---|---|
| 6,373,205 B1 | 4/2002 | Weimer et al. | |
| 6,668,953 B1 * | 12/2003 | Reik et al. | B60K 6/08 180/165 |
| 8,403,120 B2 | 3/2013 | Voegtle et al. | |
| 8,459,425 B2 | 6/2013 | Ruder et al. | |
| 9,032,838 B2 | 5/2015 | Nachtmann et al. | |
| 2003/0106729 A1 * | 6/2003 | Noreikat et al. | B60K 6/40 180/65.7 |
| 2007/0108857 A1 * | 5/2007 | Nomura et al. | B60K 6/365 310/78 |
| 2009/0283344 A1 * | 11/2009 | Arnold et al. | B60K 6/26 180/65.22 |
| 2011/0259698 A1 * | 10/2011 | Arnold et al. | B60K 6/36 192/48.1 |

FOREIGN PATENT DOCUMENTS

| | | |
|---|---|---|
| DE | 10 2009 039 076 A1 | 4/2010 |
| DE | 10 2010 018 774 A1 | 11/2010 |
| DE | 10 2010 054545 A1 | 8/2011 |
| DE | 10 2011 010342 A1 | 8/2011 |
| DE | 10 2012 204815 A1 | 10/2012 |
| DE | 10 2012 204291 A1 | 11/2012 |
| FR | 2 791 008 A1 | 9/2000 |
| FR | 2 839 759 A1 | 11/2003 |
| WO | WO 2013 034 357 A1 | 3/2013 |

* cited by examiner

STRUCTURAL UNIT FOR A HYBRID POWERTRAIN

CROSS-REFERENCE TO RELATED APPLICATIONS

This is a U.S. national stage of application No. PCT/EP2014/050290, filed on 9 Jan. 2014, which claims priority to the German Application No. 10 2013 201 667.0, filed 1 Feb. 2013, the content of both incorporated herein by reference.

BACKGROUND OF THE INVENTION

1. Field of the Invention

The present invention is directed to a constructional unit for a hybrid powertrain of a motor vehicle with an electric machine having a stator and a rotor, wherein the rotor is configured to transmit a torque to the powertrain, a clutch arrangement with a clutch actuation unit, wherein the clutch arrangement is configured to decouple an internal combustion engine from the powertrain, this internal combustion engine being provided parallel to the electric machine for transmitting a torque, and with a vibration absorber apparatus, particularly a centrifugal pendulum absorber, for reducing vibrations in the powertrain.

2. Related Art

In conventional powertrains and in hybrid powertrains, the use of vibration-reducing systems for decoupling vibrations is known. In particular, a combination of a speed-adaptive mass damper and a dual-mass flywheel is used to achieve the greatest possible comfort. To take up as little installation space as possible, it is known from the prior art to arrange the speed-adaptive mass damper radially within the dual-mass flywheel. It is further known from the art to provide hybrid drives with a disconnect clutch for connecting or disconnecting the electric machine to or from the drive unit or mass damper within the electric machine.

However, for many installation space specifications in hybrid drives, it is not possible to arrange the speed-adaptive mass damper inside the dual-mass flywheel. In addition, the axial installation space is limited so that there is no space available to accommodate a dual-mass flywheel, a speed-adaptive mass damper and a disconnect clutch axially adjacent to one another. Therefore, due to lack of installation space, a speed-adaptive mass damper has been dispensed with in confined installation spaces.

However, this has the drawback that loss of comfort must be tolerated due to residual torque disturbances.

SUMMARY OF THE INVENTION

Therefore, it is an object of the present invention to provide a constructional unit for a hybrid powertrain of a vehicle which makes it possible to also accommodate a speed-adaptive mass damper in addition to a dual-mass flywheel in very limited axial installation space.

This object is met through a constructional unit and a hybrid powertrain arrangement.

According to an aspect of the invention, a constructional unit is provided for a hybrid powertrain of a motor vehicle having an internal combustion engine and an electric machine for transmitting torque. The constructional unit comprises at least one electric machine with a stator and a rotor, wherein the rotor is configured to transmit a torque to the powertrain. Further, the constructional unit has a clutch arrangement with a clutch actuation unit and a vibration absorber apparatus for reducing vibrations in the powertrain. The clutch arrangement is configured to decouple and couple an internal combustion engine from and to the powertrain, this internal combustion engine being provided parallel to the electric machine for transmitting a torque.

According to a first inventive aspect of the present invention, the invention is based on the idea of arranging the clutch actuation unit axially substantially radially within the vibration absorber apparatus. Because the clutch actuation unit is arranged radially within the vibration absorber apparatus, axial installation space can be gained so that the constructional unit can be installed compactly in its entirety.

It is further advantageous when the vibration absorber apparatus is arranged radially within the rotor rather than axially adjacent to the electric machine, particularly axially adjacent to the rotor, as was known from the prior art. In this way, additional axial installation space can be gained so that the constructional unit can be configured even more compactly.

According to a further advantageous embodiment example, not only are the vibration absorber apparatus and clutch actuation unit arranged radially within the rotor, but further elements of the clutch arrangement, particularly a pressure plate and/or a clutch disk and/or an apply plate and/or an elastic return element cooperating with the clutch actuation unit can also be arranged substantially radially within the rotor. This further reduces the axial installation space requirement.

It is, of course also possible to arrange only elements of the clutch arrangement such as, for example, pressure plate, clutch disk, apply plate or elastic return element radially within the rotor, while the vibration absorber and clutch actuation unit which is arranged radially within the vibration absorber can be arranged axially adjacent to the rotor. In view of the fact that the elements of the clutch device in particular have a large installation space requirement axially, a compact constructional unit also results in this case.

According to a further inventive aspect, the invention is based on the idea for the constructional unit described above that the vibration absorber apparatus and at least one element of the clutch arrangement, particularly a pressure plate and/or clutch disk and/or an apply plate and/or an elastic return element cooperating with the clutch actuation unit are arranged axially substantially radially within the rotor. In view of the fact that particularly the elements of the clutch arrangement and, of course, the elements of the vibration absorber apparatus occupy most of the installation space axially, as has already been briefly outlined above, an arrangement of these elements in the radially inner region of the rotor is advantageous and makes possible a very compact arrangement of the constructional unit for the hybrid drive.

As is shown by a further advantageous embodiment example, the clutch actuation unit can also be arranged axially substantially radially within the vibration absorber apparatus so that an extremely compact constructional unit is provided.

According to a further advantageous embodiment example, the vibration absorber apparatus is formed as a speed-adaptive vibration absorber with at least one damper mass that can be deflected along a deflection path. In addition to the conventionally employed dual-mass flywheel which absorbs most of the torque disturbances, the speed-adaptive mass damper which is additionally provided can counteract a residual torque disturbance so that any torsional vibration amplitudes that max be present are virtually compensated. A particularly good vibration decoupling can be achieved in this way. Further, because of the above-described options for arranging the individual elements, an extremely compact constructional unit can be provided which is also simple to assemble.

According to a further advantageous embodiment example, the vibration absorber apparatus is arranged at the rotor so as to be fixed with respect to rotation relative to it. Accordingly, the rotor can serve as impact protection of the speed-adaptive damper masses.

According to a further advantageous embodiment example, the vibration absorber apparatus also has at least one damper mass carrier which is configured to carry the at least one damper mass such that the damper mass is pendulously mounted. Advantageously, this damper mass carrier is connected to the rotor so as to be fixed with respect to rotation relative to it, and it can be produced as part of the rotor or as a separately constructed element.

According to a further advantageous embodiment example, the vibration absorber apparatus has a damper mass carrier with at least one first damper mass arranged at the one side of the damper mass carrier and at least one second damper mass arranged at the other side of the damper mass carrier. This is particularly advantageous when a very great damper mass is to be provided, this damper mass can then be provided by the damper masses which are arranged on both sides of the carrier.

According to a further advantageous embodiment example, the vibration absorber apparatus is constructed in such a way that it further has a first damper mass carrier and a second damper mass carrier which are configured to surroundingly receive at least one damper mass. A very robust vibration absorber can be formed in this way.

According to a further advantageous embodiment example, the first damper mass carrier is connected to the rotor so as to be fixed with respect to rotation relative to it, while the second damper mass carrier is fixed to the first damper mass carrier so as to be fixed with respect to rotation relative to it, particularly by fasteners, preferably by spacer bolts. In this way, the unit comprising damper mass carrier, damper mass, damper mass carrier can be preassembled as constructional unit and fastened directly to the rotor.

It may be further advantageous to form the first damper mass carrier integral with the rotor. In this way, the quantity of elements to be installed is reduced and further axial installation space and weight can be economized.

Further, for purposes of optimizing the installation space, one of the two damper mass carriers can be constructed as a rotor position sensor/rotor carrier or can receive the latter. The rotor position sensor/rotor carrier or the damper mass carrier receiving it is connected to the rotor carrier, while the other damper mass carrier is either formed integral with the rotor carrier or is fastened to the rotor carrier by the fasteners described above or is supported at the other damper mass carrier rotor position sensor/rotor carrier.

According to a further advantageous embodiment example, the rotor has a rotor projection that extends radially inward. This can be used as a damper mass carrier or as a fastening element for a damper mass carrier. To this end, the rotor projection can be formed directly as a casting while the rotor is being formed.

In general, fastening between rotor carrier or rotor projection and damper mass carrier can be carried out, for example, by welding, diagonal screwing, riveting, screwing, press fitting and/or by a tongue-and-groove connection.

Aside from serving as fastening for a damper mass carrier or as damper mass carrier, the rotor projection can alternatively or additionally also serve as a supporting element for at least one element of the clutch arrangement, particularly for an elastic return element of the clutch arrangement. In view of the fact that the elastic return element is usually a diaphragm spring that exerts a force on the apply plate of the clutch arrangement by the clutch actuation unit, the diaphragm spring must be supported at an axially fixed element serving as a fulcrum for the diaphragm spring. This can be the rotor carrier on the one hand, but the rotor projection can also be utilized for this purpose. If the rotor projection is used, the clutch can be arranged in its entirety within the rotor independently from the rotor carrier so that a very compact constructional unit results.

Further advantages and advantageous embodiments are defined in the claims, the drawings and the description.

BRIEF DESCRIPTION OF THE DRAWINGS

The invention will be described more fully in the following with reference to embodiment examples shown in the drawings. In this regard, the depicted embodiment examples are of a purely exemplary nature and are not intended to limit the protective scope of the invention. The protective scope is defined solely by the appended claims.

In the drawings.

DETAILED DESCRIPTION OF THE PRESENTLY PREFERRED EMBODIMENTS

Figure 1:
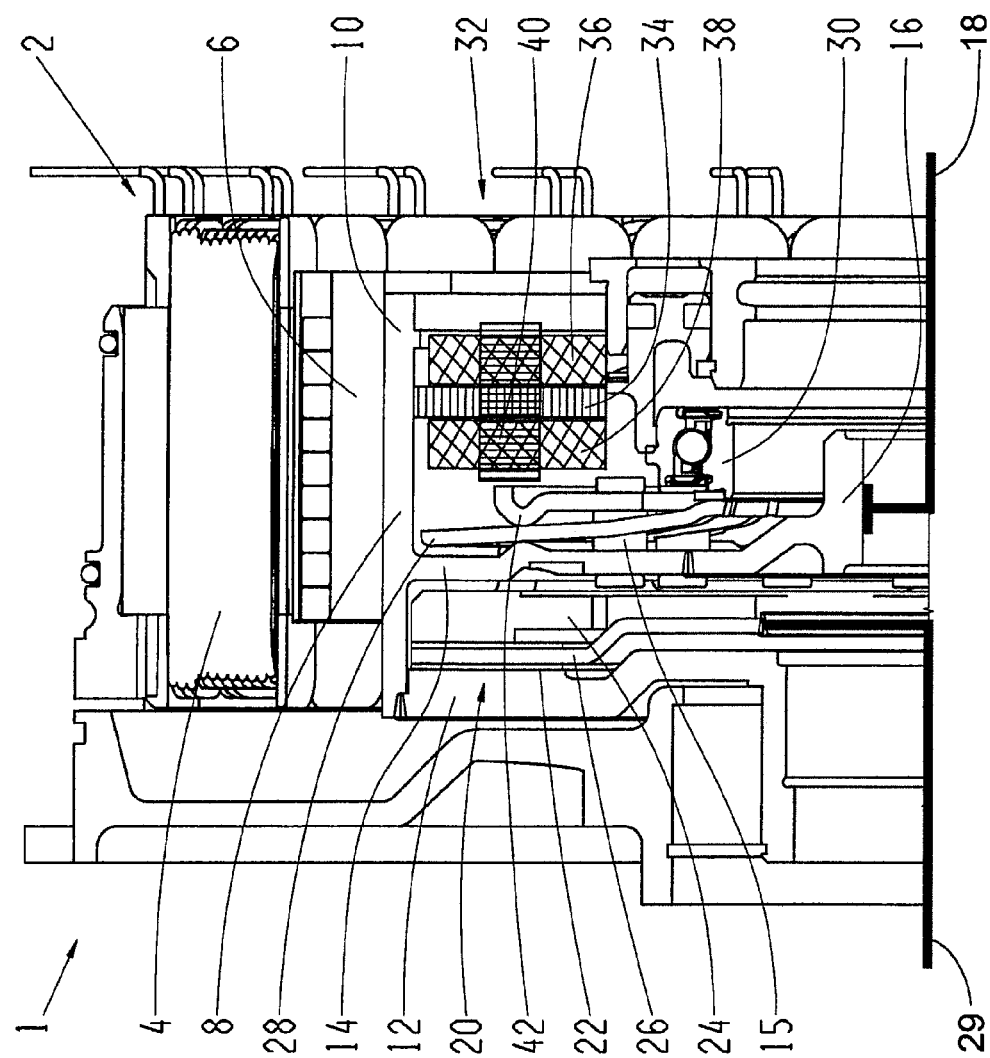
FIG. 1 shows a schematic rendering of a first embodiment example of the constructional unit according to the invention.

In the following, identical or functionally equivalent structural component parts are designated by identical reference characters.

Figure 2:
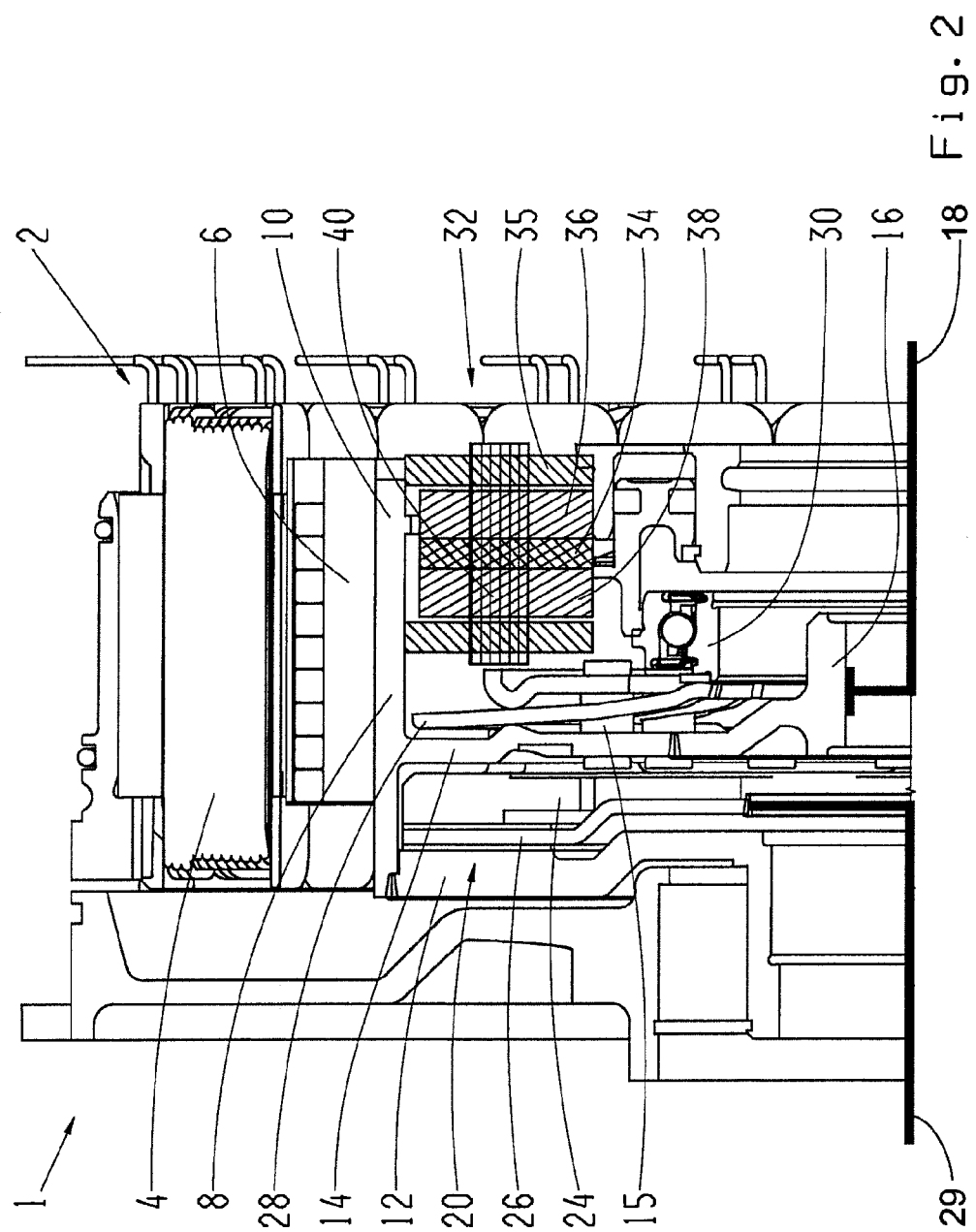
FIG. 2 shows a schematic rendering of a second embodiment example of the constructional unit according to the invention.

Let it be noted explicitly at the outset that FIGS. 1 and 2 show maximal solutions which optimize installation space and in Which the clutch arrangement, vibration absorber and clutch actuation unit are arranged radially within an electric machine in order to provide an extremely compact constructional unit for a hybrid powertrain. But this also means particularly that in addition to the embodiment examples shown here solutions of the invention allowing an arrangement of the vibration absorber and/or clutch arrangement axially adjacent to the rotor are also included. Thus, for example, the vibration absorber can be arranged axially adjacent to the rotor, but the actuation unit for the clutch is arranged axially in the same installation space, but radially within the vibration absorber. It is equally possible to arrange only one element of the clutch arrangement and the vibration absorber radially within the rotor, while the clutch actuation unit is arranged axially adjacent to the rotor.

The very compact constructional unit shown in FIGS. 1 and 2 has the advantage in particular that it occupies little axial installation space and, on the other hand, can be used as a preassembled assembly unit. The assembly process in particular can be simplified and accelerated in this way.

FIGS. 1 and 2 both show a constructional unit 1 having an electric machine 2 with a stator 4 and a rotor 6 constructed as an internal rotor. The rotor 6 has a rotor carrier 8 having an axial portion 10 and a radial portion 12. Further, the rotor carrier 8 has a rotor projection 14 formed integrally with the rotor carrier 8. In the embodiment example shown in Figs, 1 and 2, the rotor projection 14 is further configured to transmit a torque to a transmission input shaft 18. To this end, the rotor projection 14 has radially inwardly a fastening element 15 which is connected to a hub element 16. The hub element 16 is in turn connected to the transmission input shaft 18, shown only schematically in the drawings, so as to be fixed with respect to rotation relative to it.

In order to couple either an internal combustion engine (not shown) or the electric machine 2 to the transmission input shaft 18 in a torque-transmitting manner as is customary in hybrid powertrains, there is further provided a disconnect clutch 20 likewise arranged radially within the rotor 6 in the embodiment examples shown in FIGS. 1 and 2.

FIGS. 1 and 2 further show that a pressure plate 22 of the disconnect clutch 20 is formed integral with the radial projection 12 of the rotor carrier 8. The disconnect clutch 20 further has an apply plate 24 and a clutch disk 26 with friction facings configured to enter into frictional engagement with the pressure plate 22. Since the clutch disk 26 is in turn connected to an output shaft 29 of the internal combustion engine so as to be fixed with respect to rotation relative to it, a torque is transmitted from the internal combustion engine to the transmission input shaft 18 in the closed condition of the clutch device 20. The output shaft 29 is again shown only schematically in the drawings.

As can further be gathered from the drawings, an elastic return element 28 in the form of a diaphragm spring is associated with the clutch 20. The elastic return element 28 is supported at the rotor projection 14 on the one hand and at the element 42 serving as abutment on the other hand and holds the disconnect clutch in the normally closed condition. To open the disconnect clutch 20 and accordingly allow only the electric machine 2 to transmit torque to the transmission input shaft 18, there is further provided a clutch actuation unit 30 that exerts force on the diaphragm spring 28 and accordingly allows the disconnect clutch 20 to open.

As can also be seen from FIGS. 1 and 2, the clutch actuation unit 30 is arranged radially within a vibration absorber 32.

A very compact constructional unit can be provided because of the arrangement of the disconnect clutch 20 and vibration damper apparatus 32 radially within the rotor 6. Compared with the hybrid powertrains known from the prior art, for example, DE 10 2009 039 076 in which the clutch, the vibration damper apparatus and the clutch actuation unit are arranged axially adjacent to one another, the radial nesting allows an appreciable gain in installation space.

As can be seen from FIG. 1, the vibration absorber apparatus 32 can have a damper mass carrier 34 with masses 36, 38 arranged at the sides thereof. The damper mass carrier 34 can be fastened to the rotor carrier 8 at the axial portion 10 so as to be fixed with respect to rotation relative to it. It is also possible to secure the damper mass carrier 34 to the rotor projection 14 by fastening elements 40. The vibration absorber is constructed as a speed-adaptive mass damper which has pendulously suspended masses 36, 38. The principle of a vibration absorber of this kind is known from the art.

The damper mass carrier 34 shown in FIG. 1 can preferably be fastened to the rotor carrier 8 by welding, diagonal screwing, riveting, screwing, press fitting or by a tongue-end-groove connection, although it is also possible to form the damper mass carrier 34 in one piece or integral with the rotor carrier 8.

As an alternative to the vibration absorber shown in FIG. 1, the vibration absorber can also have two damper mass carriers 34, 35 receiving a mass 36 therebetween, as is shown in FIG. 2. The damper mass carriers 34, 35 can in turn be connected to the rotor carrier 8 so as to be fixed with respect to rotation relative to it, possibly to the axial portion 10 and/or to the rotor projection 14.

Let it be explicitly noted once again that the axial arrangement comprising clutch arrangement 20, vibration absorber apparatus 32 and actuation device 30 is purely exemplary and can just as well be configured differently.

If two damper mass carriers 34, 35 are arranged laterally as is shown in FIG. 2, one of the two lateral damper mass carriers 34, 35 can also be formed, for example, by the rotor projection 14.

Further, it is possible for the one lateral damper mass carrier 34, 35 to be connected to the rotor carrier 8 so as to be fixed with respect to rotation relative to it, for example, by welding, diagonal screwing, riveting, screwing, press fitting and/or by a tongue-and-groove connection, but the other damper mass carrier 35, 34 need not have any connection at all to the rotor carrier 8 but rather can be fastened to the other damper mass carrier 34, 35, for example, by spacer bolts.

It is further possible that one of the two damper mass carriers 34; 35 is formed by a rotor position sensor/rotor carrier or receives the latter. In this case, the rotor position sensor/rotor carrier is connected to the rotor carrier 8 by the connection options mentioned above. The other of the two damper mass carriers 35, 34 can in turn be formed in one piece with the rotor carrier 8 or fastened to the latter by the methods described above or can be supported at the other damper mass carrier 34, 35 by the standoff bolts.

Overall, the construction according to the invention allows an appreciably more compact construction of a hybrid powertrain. A maximal solution comprises an arrangement of clutch device, clutch actuation unit and vibration absorber radially within the electric machine. Since the actuation device is arranged radially inwardly of the damper masses, a maximum possible radius for damper masses and clutch disks is also possible within the electric machine. Further, this results in a constructional unit comprising clutch, clutch actuation, electric machine and mass damper representing a very compact vibration-reducing, torque-transmitting constructional unit which additionally facilitates the assembly process. Further, the damper mass carrier can be formed as part of the rotor, which again has the advantage that the rotor can additionally provide impact protection for the torque-adaptive mass damper.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A constructional unit (1) for a hybrid powertrain of a motor vehicle comprising:
an electric machine (2) having a stator (4) and a rotor, wherein the rotor (6) is configured to transmit a torque to the powertrain;
a clutch arrangement (20) with at least one clutch actuation unit (30), wherein the clutch arrangement (20) is configured to decouple an internal combustion engine from the powertrain, the internal combustion engine being provided parallel to the electric machine (2) for transmitting a torque; and
a vibration absorber apparatus (32) configured to reduce vibrations in the powertrain,
wherein the vibration absorber apparatus (32) and at least one element of the clutch arrangement (20) comprising at least one selected from the group of a pressure plate (22), a clutch disk (26), an apply plate (24) and an elastic return element (28) cooperating with clutch actuation unit (30), are arranged axially substantially radially within the rotor (6), and
wherein the vibration absorber apparatus (32) is constructed as a speed-adaptive vibration absorber apparatus (32) with at least one damper mass (36; 38) deflectable along a deflection path, wherein the vibration absorber apparatus (32) also has at least one damper mass carrier (34; 35) configured to carry the at least one damper mass (36; 38) such that the damper mass (36; 38) is pendulously mounted.

2. The constructional unit (1) according to claim 1, wherein the clutch actuation unit (30) is arranged axially substantially radially within the vibration absorber apparatus (32).

3. The constructional unit (1) according to claim 1, wherein at least one damper mass carrier (34; 35) is arranged at the rotor (6) so as to be fixed with respect to rotation relative to the rotor (6).

4. The constructional unit (1) according to claim 1, wherein the at least one damper mass carrier (34; 35) has at least one first damper mass (36; 38) arranged at a first side of the at least one damper mass carrier (34; 35) and at least one second damper mass (36; 38) arranged at a second side of the at least one damper mass carrier (34; 35).

5. The constructional unit (1) according to claim 1, wherein the at least one damper mass carrier (34, 35) has a first damper mass carrier (34; 35) and a second damper mass carrier (34; 35) configured to surroundingly receive at least one damper mass (36; 38).

6. The constructional unit (1) according to claim 5, wherein the first damper mass carrier (34; 35) is connected to the rotor (6) so as to be fixed with respect to rotation relative to the rotor (6), and the second damper mass carrier (34; 35) is fixed to the first damper mass carrier (34; 35) so as to be fixed with respect to rotation relative to the first damper mass carrier by fasteners.

7. The constructional unit (1) according to claim 6, wherein the first damper mass carrier (34; 35) is formed integrally with the rotor (6).

8. The constructional unit (1) according to claim 6, wherein one of the first and second damper mass carriers (34; 35) is constructed as a rotor position sensor/rotor carrier.

9. The constructional unit (1) according to claim 6, wherein the fasteners comprise bolts.

10. A hybrid powertrain with an internal combustion engine and an electric machine (2) provided parallel to the internal combustion engine for transmitting a torque from the internal combustion engine and/or electric machine (2) to a transmission, wherein a constructional unit (1) according to claim 1 is arranged between the internal combustion engine and the transmission.

11. A constructional unit (1) for a hybrid powertrain of a motor vehicle comprising:
an electric machine (2) having a stator (4) and a rotor, wherein the rotor (6) is configured to transmit a torque to the powertrain;
a clutch arrangement (20) with at least one clutch actuation unit (30), wherein the clutch arrangement (20) is configured to decouple an internal combustion engine from the powertrain, the internal combustion engine being provided parallel to the electric machine (2) for transmitting a torque; and
a vibration absorber apparatus (32) configured to reduce vibrations in the powertrain,
wherein the vibration absorber apparatus (32) and at least one element of the clutch arrangement (20) comprising at least one selected from the group of a pressure plate (22), a clutch disk (26), an apply plate (24) and an elastic return element (28) cooperating with clutch actuation unit (30), are arranged axially substantially radially within the rotor (6),
wherein the rotor (6) has a rotor projection (14) which extends radially inwardly,
wherein the at least one element of the clutch arrangement (20) comprises the elastic return element (28) and the rotor projection (14) serves as a supporting element for the elastic return element (28) of the clutch arrangement (20), and
wherein the vibration absorber apparatus (32) has at least one damper mass carrier (34; 35), and wherein the at least one damper mass carrier (34; 35) of the vibration absorber apparatus (32) is connected to the rotor projection (14) so as to be fixed with respect to rotation relative to the rotor projection (14).

12. A constructional unit (1) for a hybrid powertrain of a motor vehicle comprising:
an electric machine (2) having a stator (4) and a rotor, wherein the rotor (6) is configured to transmit a torque to the powertrain;
a clutch arrangement (20) with at least one clutch actuation unit (30), wherein the clutch arrangement (20) is configured to decouple an internal combustion engine from the powertrain, the internal combustion engine being provided parallel to the electric machine (2) for transmitting a torque; and
a vibration absorber apparatus (32) configured to reduce vibrations in the powertrain,
wherein the vibration absorber apparatus (32) and at least one element of the clutch arrangement (20) comprising at least one selected from the group of a pressure plate (22), a clutch disk (26), an apply plate (24) and an elastic return element (28) cooperating with clutch actuation unit (30), are arranged axially substantially radially within the rotor (6),
wherein the rotor (6) has a rotor projection (14) which extends radially inwardly,
wherein the at least one element of the clutch arrangement (20) comprises the elastic return element (28) and the rotor projection (14) serves as a supporting element for the elastic return element (28) of the clutch arrangement (20), and
wherein the rotor projection (14) comprises a damper mass carrier (34; 35).

* * * * *